United States Patent [19]

Nilsen

[11] Patent Number: 5,003,544
[45] Date of Patent: Mar. 26, 1991

[54] X-RAY LASER

[75] Inventor: Joseph Nilsen, Livermore, Calif.

[73] Assignee: The United States of Americal as represented by the Department of Energy, Washington, D.C.

[21] Appl. No.: 420,433

[22] Filed: Oct. 12, 1989

[51] Int. Cl.$^5$ .............................................. H01S 3/30
[52] U.S. Cl. ............................................ 372/5; 372/76
[58] Field of Search ........................... 372/5, 70, 73, 76

[56] References Cited

U.S. PATENT DOCUMENTS

| | | | |
|---|---|---|---|
| 4,012,640 | 3/1977 | McKnight et al. | 372/5 |
| 4,229,708 | 10/1980 | Mani et al. | 372/5 |
| 4,589,113 | 5/1986 | Hagelstein | 372/5 |
| 4,592,056 | 5/1986 | Elton | 372/5 |
| 4,827,479 | 5/1989 | Campbell et al. | 372/5 |

OTHER PUBLICATIONS

Matthews et al., "Demonstration of a Soft X-Ray Amplifier", Physical Review Letters, vol. 54, No. 2, (Jan. 14, 1985), pp. 110–113.
Rosen et al., "Exploding Foil Technique for Achieving a Soft X α Ray Laser", Physical Review Letters, vol. 54, No. 2, (Jan. 14, 1985), pp. 106–109.
"Livermore Group Reports Soft X-Ray Laser", Physics Today (Mar. 1985), pp. 17–19.
Matthews et al., "Soft X-Ray Lasers", Scientific American (Dec. 1988), pp. 86–91.
MacGowan et al., "Demonstration of Soft X-Ray Amplification in Nickel-Like Ions", Physical Review Letters, vol. 59, No. 19 (Nov. 9, 1987), pp. 2157–2160.

Primary Examiner—Frank Gonzalez
Assistant Examiner—Susan S. Morse
Attorney, Agent, or Firm—Henry P. Sartorio; L. E. Carnahan; William R. Moser

[57] ABSTRACT

An X-ray laser (10) that lases between the K edges of carbon and oxygen, i.e. between 44 and 23 Angstroms, is provided. The laser comprises a silicon (12) and dysprosium (14) foil combination (16) that is driven by two beams (18, 20) of intense line focused (22, 24) optical laser radiation. Ground state nickel-like dysprosium ions (34) are resonantly photo-pumped to their upper X-ray laser state by line emission from hydrogen-like silicon ions (32). The novel X-ray laser should prove especially useful for the microscopy of biological specimens.

7 Claims, 3 Drawing Sheets

X-RAY LASER

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention described herein relates generally to X-ray lasers, and more particularly to laboratory X-ray lasers that provide laser radiation within the wavelength range between the K absorption edges of carbon and oxygen, and are thus especially suited for use in the microscopy of biological specimens.

The first operational laboratory X-ray laser is taught by Campbell and Rosen in U.S. Pat. No. 4,827,479 issued May 2, 1989. Moreover, this X-ray laser is also described by Rosen et al in Physical Review Letters 54, 106 (1985), with a discussion of the experimental demonstration of the laser provided by Matthews et al in Physical Review Letters 54, 110 (1985). This seminal work was also reported in Physics Today, March 1985, at pages 17 to 19.

A recent review of soft X-ray lasers is provided by Matthews and Rosen in Scientific American, December 1988, at pages 86 to 91. This article is incorporated by reference herein. At page 86, the article states that the X-ray lasers now in operation ". . . produce soft X-rays down to about five nanometers . . . ", that, is down to wavelengths as short as about 50 Angstroms. This is unfortunate, because an X-ray laser operating at significantly shorter wavelengths, between the K edge of carbon at 44 Angstroms and the K edge of oxygen at 23 Angstroms, would be ideal for the microscopy of biological specimens in terms of penetration, contrast, and resolution.

SUMMARY OF THE INVENTION

It is, therefore, an object of the invention to provide a novel laboratory X-ray laser.

Another object of the invention is to provide a novel laboratory X-ray laser that produces X-ray laser radiation, at significant gain, within the 44 to 23 Angstrom wavelength range.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, an inventive resonantly photo-pumped laboratory X-ray laser is disclosed in which means are provided for producing a quantity of nickel-like dysprosium ions in the ground state, together with means for resonantly photo-pumping these ions to the $\overline{3s_1}4p_3/2(J=1)$ level, which is the upper laser state of the new laser. The resonant photo-pumping is accomplished by a means that generates a quantity of hydrogen-like silicon ions in the $2p_3/2$ state, in the spatial and temporal proximity of the nickel-like dysprosium ions, with the resonant photo-pumping taking place on a $2p_3/2$ to $1s_1$ emission line from the hydrogen-like silicon ions.

In an embodiment of this invention, the X-ray laser comprises a silicon foil upon which is deposited a dysprosium film, which together constitute a silicon and dysprosium combination. Means are provided for simultaneously illuminating the silicon and the dysprosium sides of the combination with beams of line focused, high power optical laser radiation. This driving illumination occurs over adjacent, long and thin and generally rectangular portions of the surfaces of the silicon foil and dysprosium film combination. Preferably, the silicon foil has a thickness in the approximate range from 1,000 to 20,000 Angstroms; and the dysprosium film has a thickness in the approximate range from 100 to 2,000 Angstroms. Preferably, the two simultaneous, illuminating beams of driving optical laser radiation individually each have wavelengths within the approximate range from 0.25 to 11 microns; and temporal full widths at half maximum amplitude in the approximate range from 10 to 2,000 picoseconds. Preferably, the beam that illuminates the silicon side of the combination has a power density in the approximate range extending from $3 \times 10^{14}$ to $5 \times 10^{15}$ watts per centimeter squared, and the beam that illuminates the dysprosium side of the combination has a power density in the approximate range extending from $5 \times 10^{13}$ to $3 \times 10^{14}$ watts per centimeter squared. Preferably, the adjacent, illuminated, generally rectangular portions of the silicon and dysprosium combination, each have a length in the approximate range from 0.4 to 5 centimeters, and a width in the approximate range from 50 to 200 microns.

The method for providing X-ray laser radiation, in the wavelength range between the K edges of carbon and oxygen, of this invention, comprises the steps of providing a quantity of nickel-like dysprosium ions in the ground state, and resonantly photo-pumping these ions to the $\overline{3s_1}4p_3/2(J=1)$ upper X-ray laser state. The resonantly photo-pumping step may be accomplished by generating a quantity of $2p_3/2$ state hydrogen-like silicon ions, in spatial and temporal proximity to the nickel-like dysprosium ions, and resonantly photo-pumping on a $2p_3/2$ to $1s_1$ emission line.

In another aspect of this invention, X-ray laser radiation in the wavelength range between the K edges of carbon and oxygen may be provided by the single step of simultaneously illuminating the opposite sides of a combination comprised of a silicon foil, upon which a dysprosium film has been deposited, with two driving beams of line focused, high power optical laser radiation, over adjacent, long and thin and generally rectangular portions of the silicon and dysprosium sides of the combination.

The benefits and advantages of the present invention, as embodied and broadly described herein, include, inter alia, the provision of a novel laboratory X-ray laser that produces X-ray laser radiation, at significant gain, within the 44 to 23 Angstrom wavelength range.

BRIEF DESCRIPTION OF THE DRAWINGS

The accompanying drawings, which are incorporated herein and form a part of the specification, illustrate an embodiment of the invention and, together with the description, serve to explain the principles of the invention. In the drawings.

DETAILED DESCRIPTION OF THE INVENTION

Figure 1:
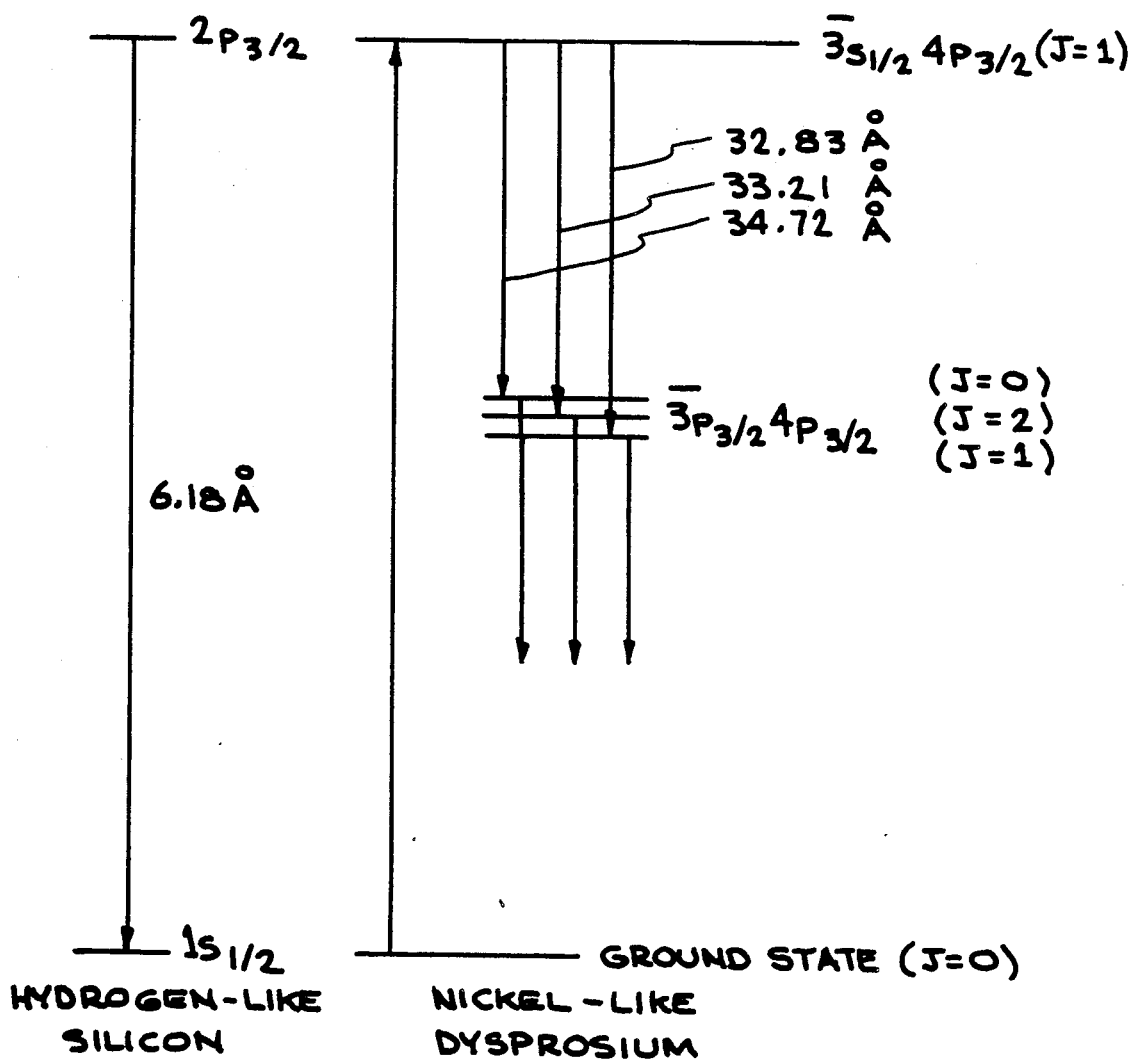
FIG. 1 is the energy level diagram of the X-ray laser of this invention.

The lasing scheme of the novel X-ray laser of this invention is shown in the energy level diagram of FIG. 1. The process comprises resonantly photo-pumping nickel-like dysprosium ions in the ground state ($J=0$) to the $\overline{3s_1}4p_3{}_{/2}(J=1)$ level. This may be accomplished using hydrogen-like silicon $2p_{3/2}$ to $1s_{\frac{1}{2}}$ line emission, that is calculated to be at approximately 6.18 Angstroms, as shown. The $\overline{3s_1}4p_3{}_{/2}(J=1)$ level is the upper laser state, which decays directly to one of the three $\overline{3s_1}4p_3{}_{/2}(J=0, 1, \text{or } 2)$ levels, which together constitute the lower laser states. X-ray laser radiation is provided at approximately 32.83, 33.21, and 34.72 Angstroms, all as calculated. The lower laser state decays very rapidly to several other singly excited states, principally the $\overline{3d}4p$ levels, not shown, and thence to the ground state. In this novel scheme, lasing occurs between $\overline{3s_1}$ and $\overline{3p}_{3/2}$ electron holes. The bar over the $3s$ and $3p$ states indicates a hole or vacancy in the closed M shell ($1s^22s^22p^63s^23d^{10}$) or nickel-like core of the dysprosium ions. Consequently, lasing can be thought of as taking place between holes in a closed M shell, with this being equivalent to lasing from $3p_{3/2}$ to $3s_{\frac{1}{2}}$. Even though this is a one electron lasing process, it is between states with many equivalent electrons. The 32.83 and 33.21 Angstrom X-ray laser lines have calculated gains which vary from 1 to 5 per centimeter, depending on the strength of the line pump.

Figure 2:
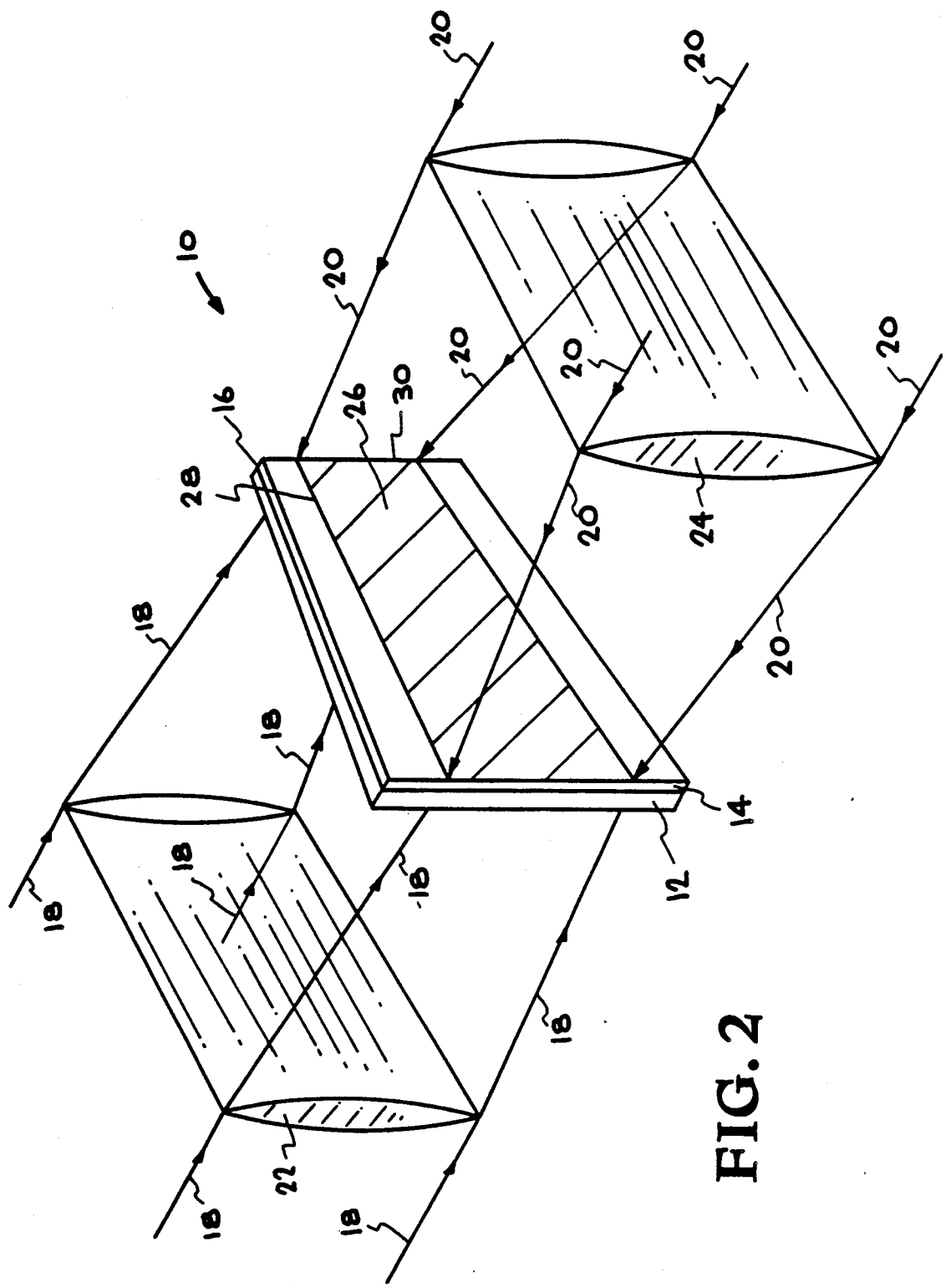
FIG. 2 is a schematic view of an X-ray laser in accordance with this invention, shown at an early time in its performance.
Figure 3:
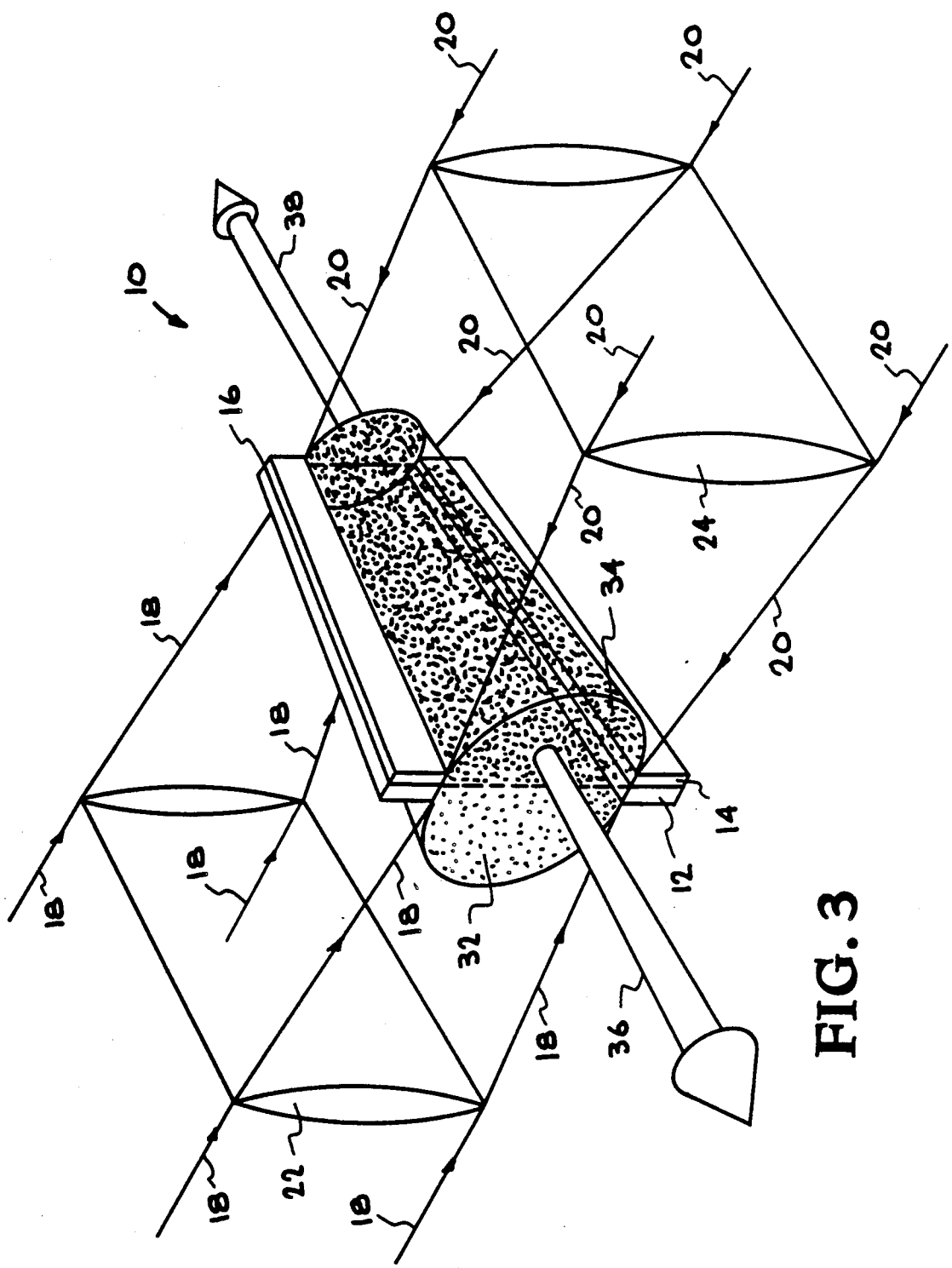
FIG. 3 is a schematic view of the X-ray laser of FIG. 2, shown at a later time in its performance, when vigorously producing X-ray laser radiation.

FIGS. 2 and 3 offer a schematic view of an X-ray laser 10, in accordance with this invention. X-ray laser 10 is the presently preferred embodiment of this invention, although it is believed that many different and highly beneficial embodiments of this invention may be realized in various situations and applications. X-ray laser 10 is shown at an early time in its performance in FIG. 2, and at a later time, when vigorously producing X-ray laser radiation, in FIG. 3. A consistent set of reference numerals is used in FIGS. 2 and 3. Since laser 10 is an X-ray laser, it utilizes no mirrors; therefore, amplification takes place on only a single pass through the system. In tis respect, X-ray laser 10 is typical of several previously known X-ray lasers.

X-ray laser 10 is comprised of a silicon foil 12, that is flat and preferably has a thickness in the approximate range from 1,000 to 20,000 Angstroms. A dysprosium film 14, flat and having a preferred thickness in the approximate range from 100 to 2,000 Angstroms, is deposited upon, or attached to, silicon foil 12, by techniques that are very well known in the prior art. In some embodiments of this invention, silicon foil 12 and dysprosium film 14 may each be attached to and supported by a very thin separating plastic layer, not shown, comprised of, for example, mylar or parylene. While use of such a plastic layer may be convenient in some situations, it is certainly not a necessary part of the concept or practice of this invention. Silicon foil 12 and dysprosium film 14 together provide a combination 16. The silicon side of combination 16 is illuminated by a beam of line focused, high power optical laser radiation 18, while, simultaneously, the dysprosium side of combination 16 is illuminated by a beam of line focused, high power optical laser radiation 20, as shown. As schematically indicated, optical laser beams 18 and 20 are line focused by a pair of cylindrical lenses 22 and 24, respectively, by techniques that are very well known in the laser-related arts. Preferably, the two simultaneous beams of optical laser radiation 18 and 20 individually each have a wavelength or wavelengths in the approximate range from 0.25 to 11 microns, and a temporal full width at half maximum amplitude in the approximate range from 10 to 2,000 picoseconds. Optical laser beam 18, that illuminates silicon foil 12, preferably has a power density in the approximate range extending from $3 \times 10^{14}$ to $5 \times 10^{15}$ watts per centimeter squared, and optical laser beam 20, that illuminates dysprosium film 14, preferably has a power density in the approximate range extending from $5 \times 10^{13}$ to $3 \times 10^{14}$ watts per centimeter squared Optical laser pulses having characteristics within these ranges are routinely provided by the Lawrence Livermore National Laboratory, located at Livermore, Ca. Optical laser beams 18 and 20 each illuminate an adjacent, long and thin and generally rectangular area on an opposite side of the silicon and dysprosium combination 16. In particular, an area 26 on the dysprosium side of combination 16, is shown in FIG. 2 as illuminated by the optical laser beam 20. A similar area, not specifically shown, on the silicon side of combination 16, is illuminated by optical laser beam 18. The area, or surface portion, 26 preferably has a length 28 in the approximate range from 0.4 to 5 centimeters, and a width 30 in the approximate range from 50 to 200 microns.

As shown in FIG. 3, the optical laser beams 18 and 20 energetically convert the portions of the combination 16 upon which they impinge, into a silicon plasma 32, and a dysprosium plasma 34. The dysprosium plasma 34 provides very many nickel-like dysprosium ions in the ground state. The silicon plasma 32, which is in spatial and temporal proximity to plasma 34, provides an abundant quantity of hydrogen-like silicon ions in the $2p_{3/2}$ state, which silicon ions emit a large amount of $2p_{3/2}$ to $1s_{\frac{1}{2}}$ line emission radiation, which radiation proceeds into plasma 34 and resonantly photo-pumps many of the nickel-like dysprosium ions that are contained in the plasma 34, to the $\overline{3s_1}4p_3{}_{/2}(J=1)$ level, which is the upper laser level of X-ray laser 10. The nickel-like dysprosium ions, in the $\overline{3s_1}4p_3{}_{/2}(J=1)$ level, in plasma 34, then proceed to provide, in accordance with the mechanisms particularly discussed above in reference to the energy level diagram of FIG. 1, a pair of X-ray laser beams 36 and 38, schematically indicated, that comprise X-ray laser radiation in the wavelength range between the K edges of carbon and oxygen.

It is thus appreciated that in accordance with the invention as herein described and shown in FIGS. 1 to 3, a novel laboratory X-ray laser is provided that produces X-ray laser radiation, at significant gain, within the 44 to 23 Angstrom wavelength range, i.e., between the K edges of carbon and oxygen.

The foregoing description of a preferred embodiment of the invention has been presented for purposes of illustration and description. It is not intended to be exhaustive or to limit the invention to the precise form disclosed, and obviously many modifications and variations are possible in light of the above teaching.

The embodiment was chosen and described in order to best explain the principles of the invention and its practical application to thereby enable others skilled in the art to best utilize the invention in various embodiments and with various modifications as are suited to the particular use contemplated It is intended that the scope of the invention be defined by the claims appended hereto.

I claim:
1. An X-ray laser comprising:
   means for providing a quantity of nickel-like dysprosium ions in the ground state; and
   means for resonantly photo-pumping the quantity of nickel-like dysprosium ions from their ground state to the $\overline{3s_1 4p_3}/2(J=1)$ level, which is the upper laser state of the X-ray laser.
2. An X-ray laser as recited in claim 1, wherein the means for resonantly photo-pumping the quantity of nickel-like dysprosium ions comprises means for generating, in spatial and temporal proximity to the quantity of nickel-like dysprosium ions, a quantity of hydrogen-like silicon ions, in the $2p_3/2$ state, which resonantly photo-pump on a $2p_3/2$ to $1s_1$ line.
3. An X-ray laser comprising:
   a silicon foil;
   a dysprosium film deposited on the silicon foil, to thereby provide a silicon foil and dysprosium film combination; and
   means for simultaneously illuminating the opposite sides of said silicon foil and dysprosium film combination with a first and a second beam of line focused, high power optical laser radiation, with the illumination occurring over adjacent, long and thin and generally rectangular portions of the silicon and dysprosium combination.
4. An X-ray laser as recited in claim 3, wherein the silicon foil has a thickness in the approximate range from 1,000 to 20,000 Angstroms; wherein the dysprosium film has a thickness in the approximate range from 100 to 2,000 Angstroms; wherein the first and second simultaneous beams of optical laser radiation individually each have a wavelength in the approximate range from 0.25 to 11 microns and a temporal full width at half maximum amplitude in the approximate range from 10 to 2,000 picoseconds, with the beam that illuminates the silicon side of the combination having a power density in the approximate range from $3 \times 10^{14}$ to $5 \times 10^{15}$ watts per centimeter squared, and with the beam that illuminates the dysprosium side of the combination having a power density in the approximate range from $5 \times 10^{13}$ to $3 \times 10^{14}$ watts per centimeter squared; and wherein the adjacent, generally rectangular illuminated portions of the silicon and dysprosium combination, each have a length in the approximate range from 0.4 to 5 centimeters, and a width in the approximate range from 50 to 200 microns.
5. A method for providing X-ray laser radiation in the wavelength range between the K edges of carbon and oxygen, the method comprising the steps of:
   providing a quantity of nickel-like dysprosium ions in the ground state; and
   resonantly photo-pumping the quantity of nickel-like dysprosium ions from their ground state to the $\overline{3s_1 4p_3}/2(J=1)$ upper X-ray laser state.
6. The method of Claim 5, wherein the resonantly photo-pumping step comprises the step of generating a quantity of hydrogen-like silicon ions, in the $2p_3/2$ state, in spatial and temporal proximity to the quantity of nickel-like dysprosium ions, whereby the resonant photo-pumping occurs on a $2p_3/2$ to $1s_1$ emission line in the hydrogen-like silicon.
7. A method for providing X-ray laser radiation in the wavelength range between the K edges of carbon and oxygen, comprising the step of simultaneously illuminating the opposite sides of a combination comprised of a silicon foil that has a dysprosium film deposited on one side thereof, with a first and a second beam of line focused, high power optical laser radiation, over adjacent, long and thin and generally rectangular portions of the silicon and dysprosium combination.

* * * * *